United States Patent Office.

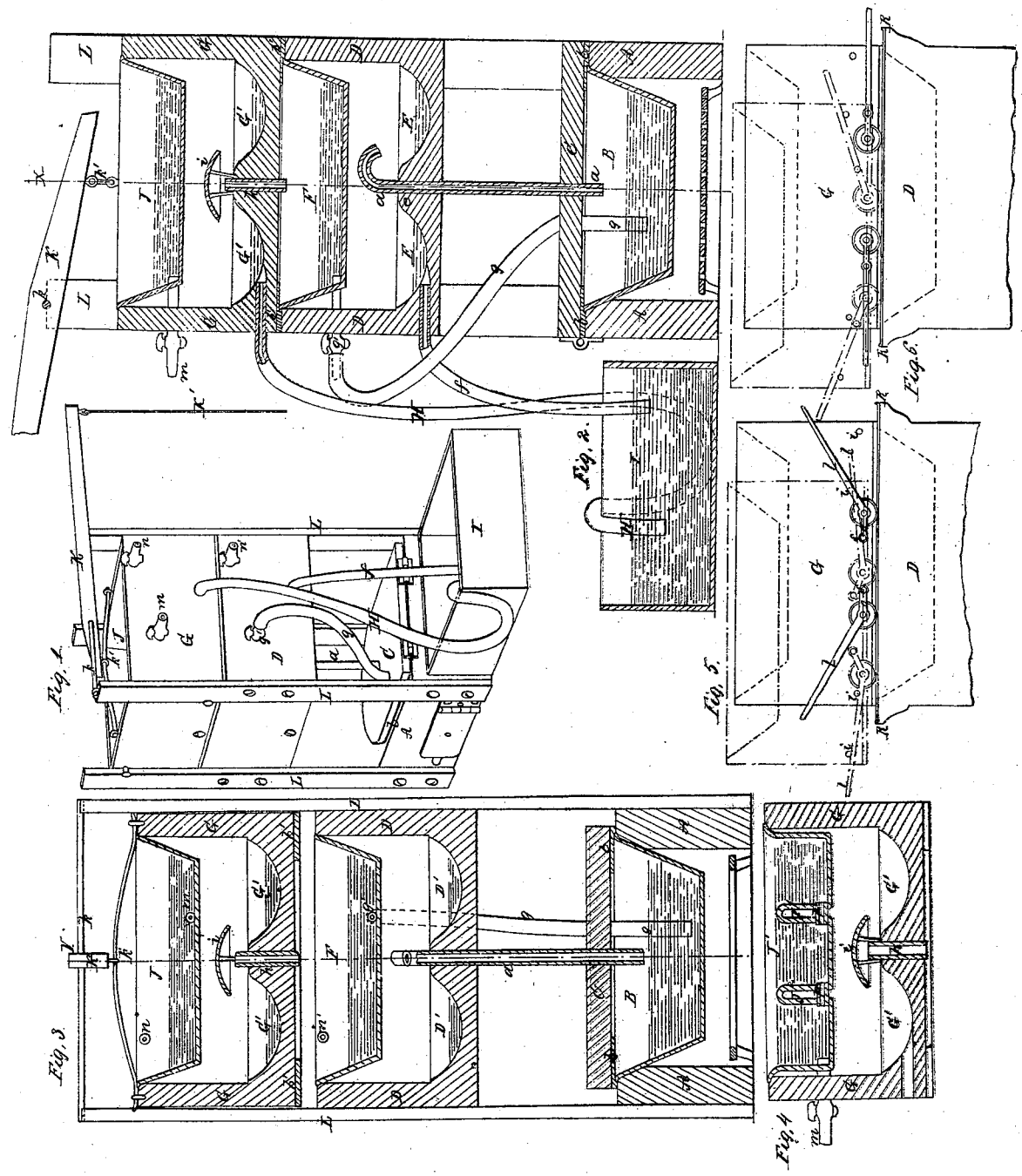

JOSIAH J. SHERMAN, OF ALBANY, NEW YORK.

Letters Patent No. 86,948, dated February 16, 1869.

IMPROVED APPARATUS AND PROCESS OF EVAPORATING LIQUIDS.

The Schedule referred to in these Letters Patent and making part of the same.

*To all whom it may concern:*

Be it known that I, JOSIAH J. SHERMAN, of the city of Albany, in the county of Albany, and State of New York, have invented a new and improved Apparatus and Process of Evaporating Liquids; and I do hereby declare that the following is a full, clear, and exact description thereof, reference being had to the accompanying drawings, making a part of this specification, in which—

Figure 1, sheet 1, is a perspective view of one form of apparatus adapted for conducting the improved process.

Figure 2, sheet 1, is a vertical section, taken centrally through the apparatus, exposing to view its interior construction.

Figure 3, sheet 1, is a vertical section, taken transversely through fig. 2, in the plane indicated by red line X.

Figure 4, sheet 1, is a vertical central section through an evaporator, having its pan or vat subdivided by hollow partitions.

Figures 5 and 6, sheet 2, illustrate two modes of removing the supplemental pans horizontally from a position over an antecedent or lower pan, or vat.

Similar letters of reference indicate corresponding parts in the several figures.

The object of this invention is to utilize a large proportion or the whole of the latent and sensible heat of the vapor which escapes from vessels during the process of evaporating liquids, by combining, with one or more primary evaporating-vessels, one or more supplemental evaporating-vessels, in such manner that the latter shall be exposed to the heat of the vapor generated in the primary vessel, or vessels, as will be hereinafter explained.

To enable others skilled in the art to understand my invention, I will describe the best means known to me for carrying it into effect.

In reference to the evaporating-pans or vessels, which I have represented in the accompanying drawings, I shall denominate the evaporator which receives heat immediately from the furnace, the primary vessel, and the others, I shall denominate supplemental vessels.

B represents a primary vessel, which is properly set in a furnace, A, from which it receives heat.

This vessel B, as well as the furnace, may be constructed in the usual or any suitable manner, and if desired to increase the evaporative capacity of the apparatus, two or more primary vessels may be employed, arranged side by side, in the same or different fire-chambers.

The vessel B is closed on top by a cover, C, which may be hinged, or otherwise attached, and between this cover and the upper edge of the said vessel or vessels, as the case may be, a packing, b, of India rubber, or other suitable material, is applied, which will make a tight joint when the cover is closed, and prevent the escape of vapor or steam rising from the liquid in the primary vessel during the process of evaporation.

This cover C may be made of wood, or of such other substance, or combination of substances, as will render it a good non-conductor of heat.

Above the primary vessel B, and supported by a suitable frame-work, L, is a steam-tight chest, D, made of a suitable non-conducting material, and having a supplemental vessel, F, fitted, in a suitable manner, into its upper end, so as to leave a steam-chamber beneath this vessel and the bottom of said chest.

The chamber, enclosed, in part, by the bottom and side walls of the chest D, and the bottom and side walls of the evaporating-vessel F, communicates with the steam above the liquid in the primary vessel B, by means of a pipe, a, which may be made in part of a flexible substance, to allow the cover C to be raised when access is desired to the primary vessel.

The upper end of pipe a is curved over within the steam-chest D, in the form of a goose-neck, for preventing condensed vapor returning into the primary vessel.

The steam which rises from the vessel B, during evaporation therein, will communicate more or less of its heat to the contents of vessel F, which is thus utilized for additional evaporation therein, and as this steam condenses, the water will be received in an annular channel, or trough, E, which is formed in the bottom of the chest D, and which surrounds the central elevation e, through which pipe a passes, from which trough the water of condensation may be conducted off, through a pipe, f, to a tank, I, or to any other suitable receptacle.

If the discharge-end of water-pipe f leads into the vessel I, and such end is immersed in the water therein, it is obvious that the density of the vapor in the steam-chest and vessel B, and its corresponding degree of heat, may be indefinitely increased, according to the strength of the apparatus and the degree of restraint allowed by the depth of the tank, or the appendages hereinafter explained.

The vessel F is provided with two stop-cocks, $n'$ $g'$, which are inserted steam-tight through one of its sides, and also through one side of the chest D.

The cock $n'$, near the top of said vessel F, serves as an induction-passage for the liquid to be evaporated; and the cock $g'$, at or near the bottom of said vessel, serves as an eduction-passage to draw off the liquid, and, by a proper tube or channel, to conduct it wherever desired.

The drawing shows a pipe, g, leading from the eduction-cock $g'$, to and through the cover C of the primary vessel B, whereby liquid may be conducted from the supplemental vessel F, into this primary vessel, when it is desired to limit the degree of concentration in the former, and complete it in the latter.

For the purpose of further utilizing the heat generated in the primary vessel B, I arrange, on top of the steam-chest D, so as to cover the supplemental vessel F, another steam-chest, G, having fitted into it an evaporating-vessel, J, which parts may be constructed like the corresponding parts upon which they are supported, as shown in the drawings.

In this instance, I make the bottom of the steam-chest G, together with a packing, $b'$, serve as a steam-tight cover for the vessel F, and establish communication between the steam-space above the liquid in the latter vessel, and the steam-space in the chest G, by means of a vertical pipe, $h$, or a larger opening than is afforded by this pipe, which has arranged above it a shed, $i$.

This shed is so shaped as to conduct the water of condensation away from pipe or opening $h$, and cause it to drip into an annular trough, G', which corresponds to the trough E in the steam-chest D, as shown in figs. 2 and 3.

By this arrangement, the cover C and steam-pipe $a$, described in reference to the primary vessel B, are rendered unnecessary, and the loss of heat incident to such exposed parts is obviated.

In this modification, it is necessary to provide for occasionally lifting or removing the steam-chest G from its working-position, to allow convenient access to the vessel J.

For this purpose, I may use a lever, K, having its fulcrum at $k$, and connected, by a link and bail, or other suitable means, to the chest G, which chest is allowed a vertical movement, and is guided by the uprights of frame L, and studs or cleats applied to its sides.

A rope, attached to the longest arm of said lever, may be used for drawing down this arm, and elevating the chest and its vessel, or blocks and tackle may be used, instead of a simple rope, for this purpose.

A pipe may be applied to the eduction-cock $m$ of the vessel J, and caused to conduct its concentrated contents into either one of the vessels F B, or wherever may be desired.

In this modification of steam-chest and its evaporating-vessel, I have also shown a mode of increasing automatically the restraint desired to be imposed upon the escape of the water of condensation from the steam-chamber in chest G, and thus also increasing the density and corresponding heat of the steam contained therein, supposing it to be generated in greater quantities than will be absorbed by the bottom of vessel J, at or slightly above atmospheric pressure.

To this end, I employ a waste-pipe, H, leading from the chamber in the steam-chest G, into the tank I.

This pipe may be made of any desired length, and it is carried down outside of the tank I, and its nozzle passed over the side of this tank, and immersed in the water therein, substantially as shown in figs. 1 and 2.

Its operation will be as follows:

The water of condensation accumulating in the steam-chest, having no exit but through the tube H, soon fills it to a height corresponding to that of the tank. Hence, supposing the tank to be filled, the water of condensation cannot pass from the steam-chamber until it shall overcome, in addition to the atmospheric pressure, the weight of the column of water contained in the tank-side of the pendent portion of the said pipe, and this confinement of the water of condensation confines and intensifies the steam also. But such increase of pressure in a steam-chest will not, in all cases, be desirable. Where circumstances will admit of a suitable degree of horizontal enlargement of the supplemental evaporating-vessels and their steam-chests beyond the size of the primary vessel, or vessels, their comparative size may be so increased, that their condensing or heat-absorbing surfaces will be more than equal to the absorption of all the heat transmissible from one to the other, and in such cases, it is obvious that one enlarged supplemental vessel may suffice, not only for one, but for several primary vessels, and the process and apparatus described, be simplified accordingly.

Where this horizontal enlargement is not admissible, two, three, or more supplemental vessels may be used in their due relative positions, either directly, or by means of the proper communicating-pipes, obliquely above or away from their primary or antecedent vessels, or one another, will operate with more or less of the supplemental gains due to their use, according to the completeness of their construction and arrangement.

It is obvious that the arrangement of the vessel J and its steam-chest, and adjustment to the vessel F, as above described, are also applicable to the primary vessel B, and *vice versa*, and so of any subsequent ones.

Although the form of the supplemental vessels above described will, in many cases, be preferable, on account of the large under surface exposed to the action of the heat within given horizontal limits, it is not indispensable that the bottoms of the vessels be anything more in this respect than simple metallic diaphragms, so placed and adjusted as to form flat steam-tight roofs to the chambers of the steam-chests.

Where it is desired to place a supplemental vessel directly upon a primary or another supplemental vessel, a vertical stop-cock, passed steam-tight through both the roof and shed of the steam-chest, may be substituted for the eduction-pipe $g$, when it is desired to pass the contents of the superimposed vessel into the vessel below it.

The supplemental vessels may be so constructed as to expose a very large amount of surface to the action of the heat in their steam-chests, within a given horizontal area.

This may be done by corrugating the bottoms of the vessels, or by forming arched or hollow partitions, $J^2$, as shown in fig. 4, which rise from the bottom of the vessel J, a suitable height, and separate this vessel into several apartments, which latter communicate with each other through short horizontal pipes, $p$, passing transversely through said partitions.

There are several modes of removing the supplemental vessels, with their steam-chests, sufficiently aside from their primary or antecedent vessels, to allow convenient access to them without injury to the packing interposed to make steam-tight joints, as would be required when one is placed immediately upon top of the other.

One mode is shown in fig. 5, sheet 2, and consists of four wheeled levers, $l\ l$, two on each side of the chest G, properly disposed and adapted to roll upon rails R, which are laid upon the chest D, containing the lower vessel or vessels.

In this instance, $o\ o$ are the short arms of the levers vibrating upon studs at $s\ s$, which confine the levers to the sides of the chest near its bottom.

The wheels upon the levers afford fulcra, and will roll upon the rails R when the longest arms of these levers are depressed, as indicated in red lines, fig. 5.

When the long arms of the levers are depressed far enough to elevate the steam-chest G upon its wheels, the chest may be sustained in this position by the insertion of pins into it, over the long arms of said levers, as shown at $i\ i$, fig. 5.

When thus elevated upon wheels, the said chest can be easily rolled to one side of the lower vessel or vessels, and access conveniently afforded thereto.

Fig. 6, sheet 2, shows a modification of the levers above described, and consists in applying the wheels or rollers to the extremities of the shortest arms of the levers, so that the fulcrum-attachments of these levers to the chest G, are between the said wheels and the force applied to the longest arms for lifting the chest.

I have above described several modes of practically carrying out my invention, but I do not confine myself to the precise means herein shown, as other means equivalent thereto, and operating upon the same principle, may be employed.

Having described my invention,

What I claim as new, and desire to secure by Letters Patent, is—

The condensing-apparatus, consisting of one or more supplemental chests, with their steam-chambers and evaporating-vats, when constructed and adjusted with relation to one another, and in relation to one or more primary evaporators, so as to take up and utilize, for purposes of further condensation, by succeeding processes of evaporation, heat generated in the latter, before it is allowed either to pass them or escape into the atmosphere, or otherwise, all substantially as described.

JOSIAH J. SHERMAN.

Witnesses:
CHARLES M. JENKINS,
PAUL F. COOPER.